United States Patent
Krause et al.

[11] Patent Number: 5,057,916
[45] Date of Patent: Oct. 15, 1991

[54] METHOD AND APPARATUS FOR REFRESHING MOTION COMPENSATED SEQUENTIAL VIDEO IMAGES

[75] Inventors: Edward Krause, San Diego; Woo H. Paik, Encinitas; Vincent C. Liu, San Diego; Jerrold A. Heller, Del Mar; Paul Shen; James N. Esserman, both of San Diego, all of Calif.

[73] Assignee: General Instrument Corporation, Hatboro, Pa.

[21] Appl. No.: 614,939

[22] Filed: Nov. 16, 1990

[51] Int. Cl.[5] .......................... H04N 7/18; H04N 7/12
[52] U.S. Cl. ..................................... 358/105; 358/135
[58] Field of Search ................. 358/135, 136, 105, 12, 358/141

[56] References Cited

U.S. PATENT DOCUMENTS

4,873,575  10/1989  De Haan ............................. 358/105
4,937,668   6/1990  Hosaka ............................... 358/105

Primary Examiner—John K. Peng
Attorney, Agent, or Firm—Barry R. Lipsitz

[57] ABSTRACT

An image area is refreshed during the transmission of a set of motion compensated sequential video images. The video images are divided into a plurality of adjacent regions. The image area is refreshed during a refresh cycle by communicating a different region in each successive video image of the set without motion compensation. Motion compensation of the previously refreshed regions of the image area during the refresh cycle is restricted to an area containing only the previously refreshed regions. Video image data from a current region being refreshed is encoded for use by a decoder in identifying it as non-motion compensated data.

20 Claims, 4 Drawing Sheets

METHOD AND APPARATUS FOR REFRESHING MOTION COMPENSATED SEQUENTIAL VIDEO IMAGES

BACKGROUND OF THE INVENTION

The present invention relates to the compression of digital data, and more particularly to a method and apparatus for refreshing motion compensated digitized video signals.

Television signals are conventionally transmitted in analog form according to various standards adopted by particular countries. For example, the United States has adopted the standards of the National Television System Committee ("NTSC"). Most European countries have adopted either PAL (Phase Alternating Line) or SECAM standards.

Digital transmission of television signals can deliver video and audio services of much higher quality than analog techniques. Digital transmission schemes are particularly advantageous for signals that are broadcast by satellite to cable television affiliates and/or directly to home satellite television receivers. It is expected that digital television transmitter and receiver systems will replace existing analog systems just as digital compact discs have largely replaced analog phonograph records in the audio industry.

A substantial amount of digital data must be transmitted in any digital television system. This is particularly true where high definition television ("HDTV") is provided. In a digital television system, a subscriber receives the digital data stream via a receiver/descrambler that provides video, audio, and data to the subscriber. In order to most efficiently use the available radio frequency spectrum, it is advantageous to compress the digital television signals to minimize the amount of data that must be transmitted.

The video portion of a television signal comprises a sequence of video images (typically "frames") that together provide a moving picture. In digital television systems, each line of a video frame is defined by a sequence of digital data bits referred to as "pixels". A large amount of data is required to define each video frame of a television signal. For example, 7.4 megabits of data is required to provide one video frame at NTSC resolution. This assumes a 640 pixel by 480 line display is used with 8 bits of intensity value for each of the primary colors red, green, and blue. High definition television requires substantially more data to provide each video frame. In order to manage this amount of data, particularly for HDTV applications, the data must be compressed.

Video compression techniques enable the efficient transmission of digital video signals over conventional communication channels. Such techniques use compression algorithms that take advantage of the correlation among adjacent pixels in order to derive a more efficient representation of the important information in a video signal. The most powerful compression systems not only take advantage of spatial correlation, but can also utilize similarities among adjacent frames to further compact the data.

Motion compensation is one of the most effective tools for accounting for and reducing the amount of temporal redundancy in sequential video frames. One of the most effective ways to apply motion compensation in video compression applications is by differential encoding. In this case, the differences between two consecutive images (e.g., "frames") are attributed to simple movements. The encoder estimates or quantifies these movements by observing the two frames and sends the results to the decoder. The decoder uses the received information to transform the first frame, which is known, in such a way that it can be used to effectively predict the appearance of the second frame, which is unknown.

The encoder reproduces the same prediction frame as the decoder, and then sends the differences between the prediction frame and the actual frame. In this way, the amount of information needed to represent the image sequence can be significantly reduced, particularly when the motion estimation model closely resembles the frame to frame changes that actually occur. This technique can result in a significant reduction in the amount of data that needs to be transmitted once simple coding algorithms are applied to the prediction error signal. An example of such a motion compensated video compression system is described by Ericsson in "Fixed and Adaptive Predictors for Hybrid Predictive/Transform Coding", IEEE Transactions on Communications, Vol. COM-33, No. 12, December 1985.

A problem with differential encoding is that it is impossible to ensure that the prediction signals derived independently at the encoder and decoder sites are identical at all times. Differences can arise as a result of transmission errors or whenever one of the two units is initialized. Thus, for example, a television channel change will render the prior frame data meaningless with respect to a first frame of a new program signal.

To deal with this problem, it is necessary to provide some means of periodic refreshing. Two such methods are common. The first method is to scale the prediction signal by some constant $\alpha$ which is less than but almost equal to one. The difference between the actual image and the scaled prediction is then computed and transmitted to the decoder as before. If the encoder and decoder images are identical at a first frame interval, then they will remain identical after the next frame interval. However, if transmission errors or initial acquisition cause the initial error to be non-zero, then the error will continue to persist in the following frame. Therefore, all errors will be attenuated by the constant $\alpha$ with each passing frame, until eventually they are no longer visible. The duration of each error is controlled by $\alpha$. On the one extreme, o can be forced to approach zero in order to prevent error propagation entirely. However, this eliminates the predictive element and its associated improvement in coding efficiency. The other extreme occurs when $\alpha$ approaches one, in which case errors will continue to persist indefinitely. Note that if $\alpha$ were to exceed one, then the magnitude of the errors would increase with time and the system would be unstable.

Unfortunately, the efficiency of most image compression algorithms decreases markedly as $\alpha$ is decreased to less than one. Such compression algorithms usually seek to compact the information in the signal into a small number of coefficients or samples. A small reduction in $\alpha$ can cause the magnitude of many of these coefficients to exceed their respective transmission thresholds. In most cases, coding efficiency is based not only on the size of the coefficients, but on the number that need to be transmitted.

Another method of refreshing the image is to periodically switch from differential mode ("DPCM") to nondifferential mode ("PCM"). For example, in a thirty frame per second system, the screen could be completely refreshed at one second intervals by inserting a PCM frame after every twenty-nine DPCM frames. In this way, channel acquisition and the correction of transmission errors could be guaranteed after a delay of no more than one second. It is assumed here that the switch to PCM coding can be done without affecting the perceived quality of the reconstructed video. However, this is only possible in a variable bit rate encoding system using rate buffers to control fluctuations in the input and output data rates. Such a system is described by Chen and Pratt, in "Scene Adaptive Coder", *IEEE Transactions on Communications*, Vol. COM-32, No. 3, March 1984. Unfortunately, the resulting large number of bits due to the less efficient PCM encoding is difficult for the encoder buffer to handle, and measures used to control it may cause visible artifacts to appear in the reconstructed image.

To overcome this problem, segments or blocks of the image can be refreshed on a distributed basis. By assigning a different counter to each segment and systematically or randomly setting the initial count for each one, it is possible to attain the same refresh interval while maintaining a constant distribution of bits. It is even possible to eliminate the counters and instead, randomly refresh each segment based on a suitable probability distribution.

These methods work well if the predictor frame is set to be identical to the previous frame. However, once motion compensation is introduced, a new problem arises. The motion estimator does not limit the block displacements in such a way as to prevent overlap between refreshed and nonrefreshed regions of the image. For example, if one region of the image is refreshed during the transmission of a given frame, then there will exist an adjacent region in the same frame that has not yet been refreshed but is due to be refreshed during the next frame interval. Obviously, this unrefreshed region is much more likely to contain at least one error. Therefore, if we use this less reliable data in the unrefreshed region to predict the appearance of certain segments of the next frame, then those segments of that frame will also be subject to errors. It is therefore possible that a recently refreshed region will cease to be accurate after only one frame. In a motion compensated system, this result tends to occur whenever there is movement from an unrefreshed region to a refreshed region, causing a recently refreshed segment of the image to immediately diverge from the corresponding encoder segment, even though no transmission errors occur. Once again, the acquisition time and the duration of artifacts due to transmission errors can become unbounded.

It would be advantageous to provide a method for refreshing motion compensated sequential video frames that does not suffer from the above-mentioned problems. In particular, it would be advantageous to provide a solution that avoids large fluctuations in the compression rate while limiting the refresh interval to a reasonable bound. The present invention provides such a solution.

SUMMARY OF THE INVENTION

In accordance with the present invention, motion compensated sequential video images are automatically refreshed one region at a time. A different region in each of a plurality of said video images is communicated without motion compensation during a refresh cycle. In this manner, an image area defined by the regions is progressively refreshed by the non-motion compensated communications during the refresh cycle. The motion compensation of the video images is controlled to prevent data contained in regions not yet refreshed during a current refresh cycle from corrupting data contained in regions that have been refreshed during the current refresh cycle. In a preferred embodiment, the controlling step limits the motion compensation of regions refreshed during the current cycle to a refreshed portion of the image area. Refreshing is accomplished on a continuing basis, wherein successive subsets of received video images are refreshed during successive refresh cycles. In order to refresh the image area, adjacent regions of successive video images can be refreshed in consecutive order. There is no requirement, however, that the regions be processed in any particular order.

The regions communicated without motion compensation can be of any size and shape. In an illustrated embodiment, the regions comprise rows of pixel data. The regions can alternately comprise columns of pixel data, or any other grouping of pixels.

The motion compensating step is advantageously performed on a block-by-block basis by comparing blocks containing pixel data for a current video image to blocks containing pixel data for a previous video image. In such an implementation, the motion compensation is controlled to limit the comparison of each block being refreshed during a current refresh cycle to blocks contained in areas of a previous video image that have already been refreshed during the current cycle.

In order to provide proper decoding of the refreshed signals at a receiver, regions communicated without motion compensation are encoded to identify them as non-motion compensated data.

DETAILED DESCRIPTION OF THE INVENTION

In the apparatus and method of the present invention, different regions of successive video images are refreshed during a refresh cycle by transmitting them without motion compensation. In order to prevent motion-displaced predictor blocks from encompassing both refreshed and unrefreshed pixels, the motion compensation of regions previously refreshed during the refresh cycle is restricted to an area containing only the previously refreshed regions.

In a preferred embodiment, one column or row of the image is refreshed during each video frame interval. Although the invention is described herein in connection with horizontal row refreshing, it should be understood that the exact same concepts can be applied using vertical columns comprising adjacent vertical lines of pixel data. In the illustrated embodiment, each row comprises a set of n adjacent horizontal lines where a can be chosen based on the desired time interval for the screen to be completely refreshed. For example, if the sampling standard specifies 480 active lines of video per frame and 30 frames per second (NTSC transmission), then a refresh interval of one second requires that 16 lines of each frame be refreshed using non-motion compensated (PCM) coding. The height of each row (n lines) must be at least as large as the vertical height of the region or block used by the motion compensator. The number of lines encompassed by the motion compensator block height is referred to as m. Thus, if it is desired for m to exceed 16 lines, a larger n must be chosen and the refresh interval must be shortened accordingly. For simplicity, it is assumed that n is not only greater than or equal to, but also an integral multiple of the motion compensation block height m.

Refreshing occurs over predefined regions ("refresh window") in successive video images (e.g., frames) of a television picture. The regions to be refreshed in successive video images can be adjacent, or they can be interspersed within the video images. Where the successive refresh regions are adjacent, the refresh window is shifted vertically by n lines after each frame is processed. The window may be shifted either upwards or downwards, as long as the same direction is maintained for each successive frame. In the following description, it is assumed that the window scrolls from the top to bottom of the screen.

In order to prevent the motion displaced predictor blocks from encompassing both refreshed and unrefreshed pixels, a constraint must be placed on the motion estimator. In particular, for the row of m lines immediately preceding the refresh window, the vertical displacement of the motion estimator must be held at zero or limited to the upward direction only. Alternately, if scrolling is from bottom to top, then the vertical displacement must be held to zero or limited to the downward direction for the m lines immediately below the refresh window. In order to prevent interference from rows before the immediately preceding row, the maximum vertical displacement cannot exceed the motion compensator block height of m. Those skilled in the art will appreciate that other constraints can be substituted, as long as the vertical displacement of the motion estimator is restricted to prevent the motion estimation from encompassing unrefreshed pixels.

Figure 1:
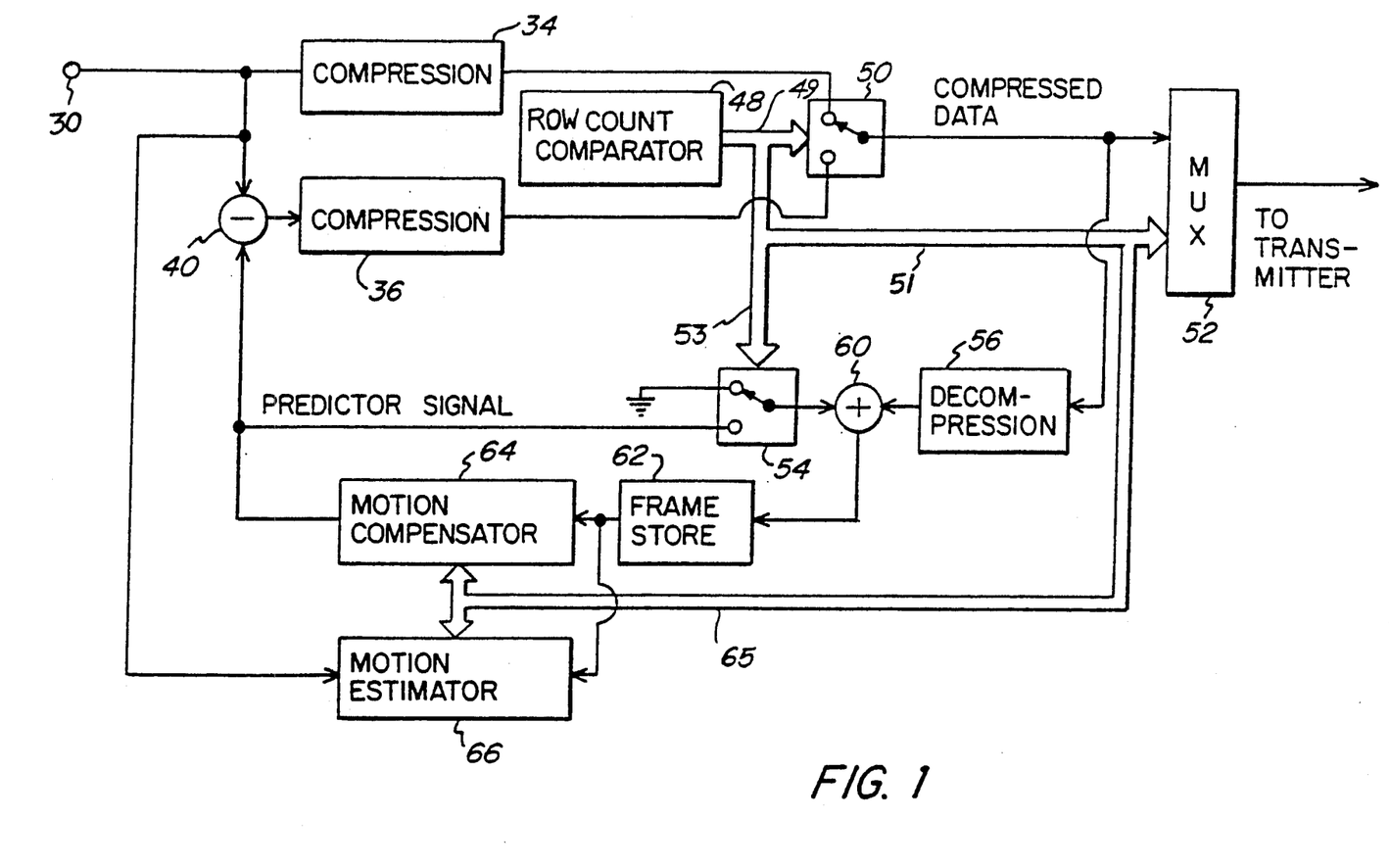
FIG. 1 is a block diagram illustrating an encoder in accordance with the present invention.

A block diagram of an encoder for implementing the present invention is shown in FIG. 1. A corresponding decoder block diagram is provided in FIG. 2. At the encoder, a video signal such as a standard digitized television signal is input at terminal 30 for compression. The signal can be interlaced or non-interlaced. The process of digitizing such video signals is well known in the art.

Any of the various data compression techniques well known in the art can be used in accordance with the present invention. The most popular compression technique is known as the discrete cosine transform ("DCT"). This technique is described in the Chen and Pratt article referred to above.

The data from terminal 30 is input to two different compression paths. In a first path, the data is processed by compression circuitry 34. For example, a conventional DCT transform coder, normalizer, run length coding and Huffmann coding can be used. It should be appreciated that any other compression technique(s) can be substituted for the compression described.

In a second compression path, a predictor signal is subtracted from the data input at terminal 30. The subtraction occurs at subtracter 40, and the resultant data is input to a compression circuit 36 which may use the same or a different compression algorithm as that used by compression circuit 34 in the first compression path.

The predictor signal subtracted from the video data in the second compression path is obtained by applying motion compensation to the previous frame, usually as it appears after processing and reconstruction. In the case where displacement is accounted for, the motion compensation process first requires the estimation of motion between the current frame and a previous frame. This information is then used to displace the previous frame in such a way that it more clearly resembles the current frame. The process is described in more detail in Ninomiya and Ohtsuka, "A Motion-Compensated Interframe Coding Scheme for Television Pictures", *IEEE Transactions on Communications*, Vol. COM-30, No. 1, January 1982.

Compressed data from the first or second compression path is decompressed using conventional circuitry 56. Where the same compression algorithm is used in the first and second compression paths, decompression circuitry 56 will apply the inverse of that algorithm. When different algorithms are used, circuitry 56 will be switched via a decision bit to provide the appropriate decompression algorithm for data selected from the first or second compression path. The resultant decompressed data is summed at adder 60 with the predictor signal from motion compensator 64 when the data has been selected from the second compression path. If data is selected from the first compression path, the predictor signal is not added back in adder 60 because it was never subtracted in the first compression path. In order to achieve this result and properly process data selected from the first and second compression paths, the motion compensation circuitry is provided with a switch 54, the operation of which is described in more detail below.

The signal output from adder 60 comprises blocks of pixel data that are input to a frame store 62. When all of the blocks representing a current frame are stored in frame store 62, the apparatus is ready to receive a new frame of data via input terminal 30. At this point, the new data is referred to as the "current frame" and the data stored in frame store 62 is referred to as the "previous frame".

Motion compensator 64 and motion estimator 66 are conventional components that are used to predict the current frame data from the previous frame data. Block displacement information, indicative of the location of a previous block that represents a preferred counterpart of a current block of pixel data within a predefined area, is determined by motion estimator 66. The preferred counterpart can comprise, for example, the previous block with the data that best matches the current block data. Motion estimator 66 inputs corresponding motion vector data (x, y) to motion compensator 64. In a case where there is no displacement between the current frame block and previous frame block used for the prediction, the motion vector will be zero. The motion vector data is also input to a multiplexer 52 which appends it to the video signals output from the encoder ("compressed data") for use in deriving an identical prediction signal at a receiver.

Figure 4:
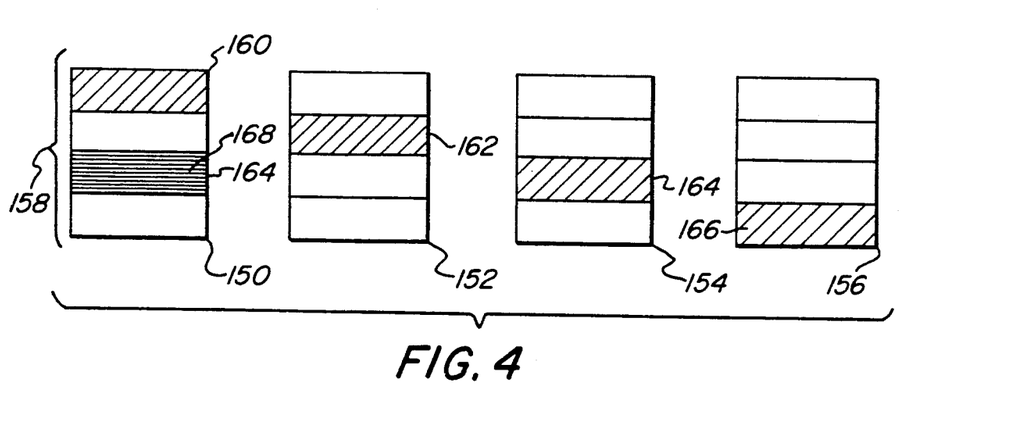
FIG. 4 is an illustration showing the refreshing of a picture area in a sequential set of video images in accordance with the present invention.
Figure 5:
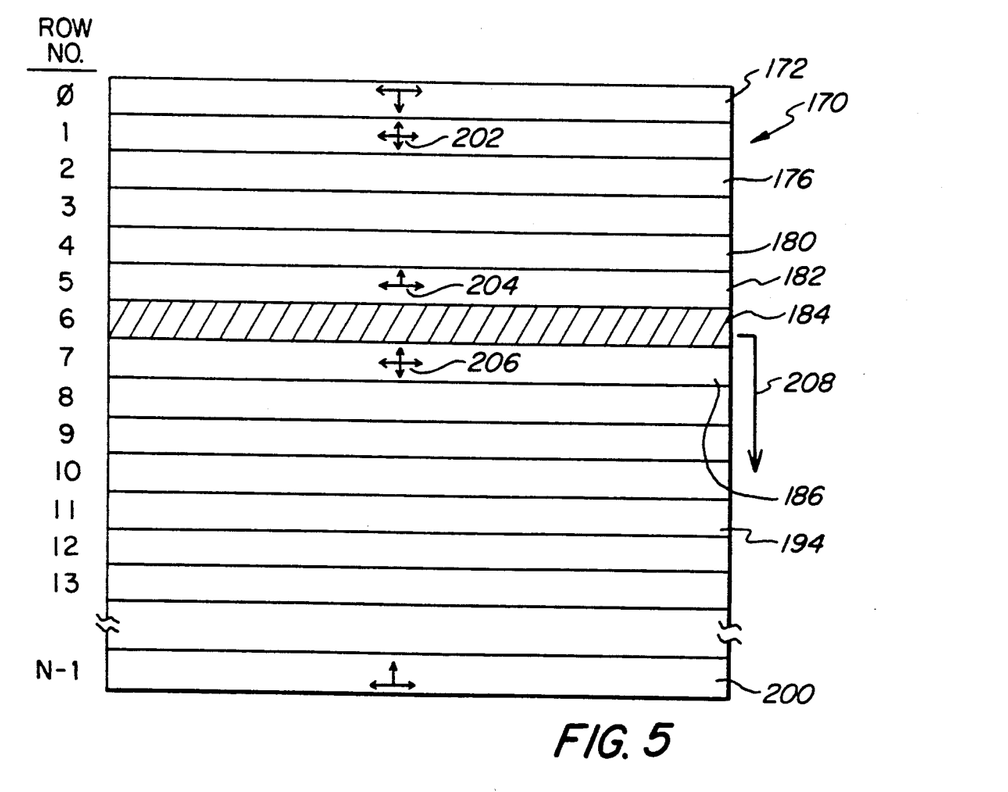
FIG. 5 is a more detailed illustration showing the refreshing of a row of video image data in a video frame.

In accordance with the illustrated embodiment of the present invention (in which the row height, block height and vertical displacement of the motion estimator are equal), the non-motion compensated data from the first compression path is used to refresh consecutive regions of successive video images. A row count comparator 48 actuates a switch 50 via path 49 to select data from either the first or second compression path. Row count comparator 48 is shown in greater detail in the block diagram of FIG. 3. The refreshing of consecutive regions in a set of successive video images is illustrated in FIG. 4. FIG. 5 illustrates the restriction of motion compensation in previously refreshed regions of the image area to an area containing only the previously refreshed regions.

Figure 3:
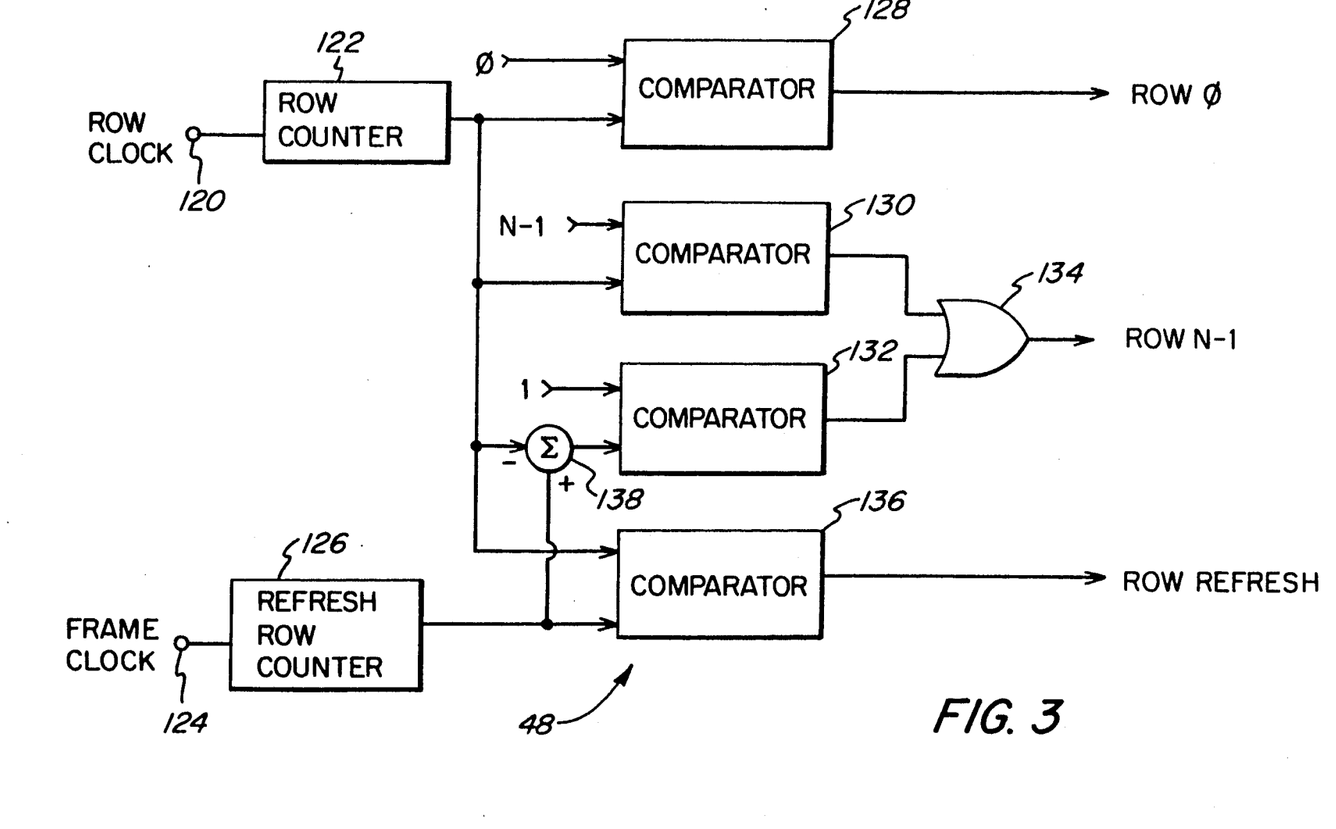
FIG. 3 is a detailed block diagram of the row count comparator circuit of FIG. 1.

In order to keep track of the refreshing of successive regions, a row clock signal is input at terminal 120 of FIG. 3 to a row counter 122, and a frame clock signal is input at terminal 124 to a refresh row counter 126. The frame clock signal is provided to increment the region or "row" to be refreshed. The row clock signal is used to keep track of the row being motion compensated.

In the set of four successive video frames 150, 152, 154, 156 illustrated in FIG. 4, rows 160, 162, 164 and 166 are consecutively refreshed. As illustrated in row 164 of video frame 150, each of the rows comprises a plurality of video data lines 168. Communicating the data from each successive row without motion compensation ultimately refreshes the entire video picture area 158. Once the picture area is refreshed, the process continuously repeats for successive sets of sequential video frames.

As noted above, the row clock keeps track of the particular row number being motion compensated in a video frame. This is best illustrated in FIG. 5, where a video frame 170 includes a plurality of rows 172 ... 200 also referred to as row numbers zero to N-1. Consecutive rows are refreshed from top to bottom, as indicated by the arrow 208. In FIG. 5, row 184 is currently being refreshed.

Motion compensation of the entire frame 170 is provided in accordance with conventional techniques except in row 182 that immediately precedes the current row 184 being refreshed. Upon reaching row 184, comparator 136 (FIG. 3) determines that the output from refresh row counter 126 is equal to the output from row counter 122, and outputs a "row refresh" signal indicating that the row due for motion compensation is the row to be refreshed. Since the refresh step requires that the row be communicated without motion compensation, the row refresh signal output from comparator 136 is coupled to switch 50 (FIG. 1) via line 49 to actuate the switch to select non-motion compensated data from the first compression path for communication to a transmitter via multiplexer 52. This results in the communication of all data in row 184 to the transmitter in the refresh mode. For all other rows, switch 50 couples the motion compensated data from the second compression path to multiplexer 52 unless other requirements require non-motion compensated data to be output.

The row refresh signal is also output as a "decision bit" on line 51 to indicate to a remote decoder that the current row is the refresh row that must be decoded without motion compensation. The compressed data, decision bit, and motion vector data (for all motion compensated rows) is multiplexed at multiplexer 52 and output to a conventional transmitter for data transmission. The row refresh decision bit also actuates switch 54 via path 53 to set one input of adder 60 to zero (i.e., ground), since the predictor signal is meaningless for the non-motion compensated refresh row.

When the row prior to the current refresh row is reached, motion estimator 66 is actuated by row count comparator 48, via a signal on line 65, to restrict motion compensation of the previously refreshed regions (i.e., rows 172 to 182) of the image area to an area containing only the previously refreshed regions. It should be noted that this limited area is exclusive of the current region (row 184) being refreshed. The actuation signal for motion estimator 66 is the signal "Row N-1" output from OR gate 134. The "Row N-1" signal is provided either when comparator 130 determines that the row to be motion compensated is the last row of the image area (FIG. 5, row 200) or when comparator 132 determines that the row to be motion compensated is the row immediately preceding the current refresh row (FIG. 5, row 182). Comparator 132 operates by comparing an input "1" to the output of a summer 138 that subtracts the current row count from the current refresh row count. When the signal "Row N-1" is true, motion estimator 66 is limited to vertical displacements of zero or displacements in the upward direction only, as indicated in FIG. 5 at direction arrows 204. Motion compensation in all other rows (except rows 172 and 200) is carried out in all directions, as indicated by arrows 202 and 206. It should be appreciated that motion compensation in all directions can be performed in row 186 immediately following the current refresh row 184, because the motion compensation data from row 186 will not be used in the next video frame. Instead, row 186 will be the current row being refreshed in the next video frame, and will be communicated without motion compensation.

The restriction of the vertical displacement 204 in line 182 can be implemented in a straightforward manner. Available integrated circuit chips for use as motion estimator 66 include built-in control signals to limit the vertical or horizontal displacement at the frame boundaries. In the vertical direction, no motion estimation is performed above the top row (row zero). Similarly, no motion estimation is performed below the bottom row (row N-1). In order to use this inherent feature of the motion estimator circuits in connection with the present invention, row count comparator 48 includes a comparator 128 to output a row zero signal at the top row of each video frame. Similarly, as discussed above, row count comparator 48 outputs a row N-1 signal either when the bottom row is being processed or when the row immediately preceding the current refresh row is being processed. In other words, the row zero signal output from comparator 128 is true only when estimating the displacement for the first row of the image, forcing the motion estimator to choose a vertical displacement of zero or a displacement in the downward direction only. On the other hand, the row N-1 signal is true when either of two rows are being processed; namely, either the last row (row N-1) or the row immediately preceding the refresh row. In both cases, motion estimation is limited to vertical displacements of zero or displacements in the upward direction only. Both the row zero and row N-1 signals are input to motion estimator 66 via line 65.

Figure 2:
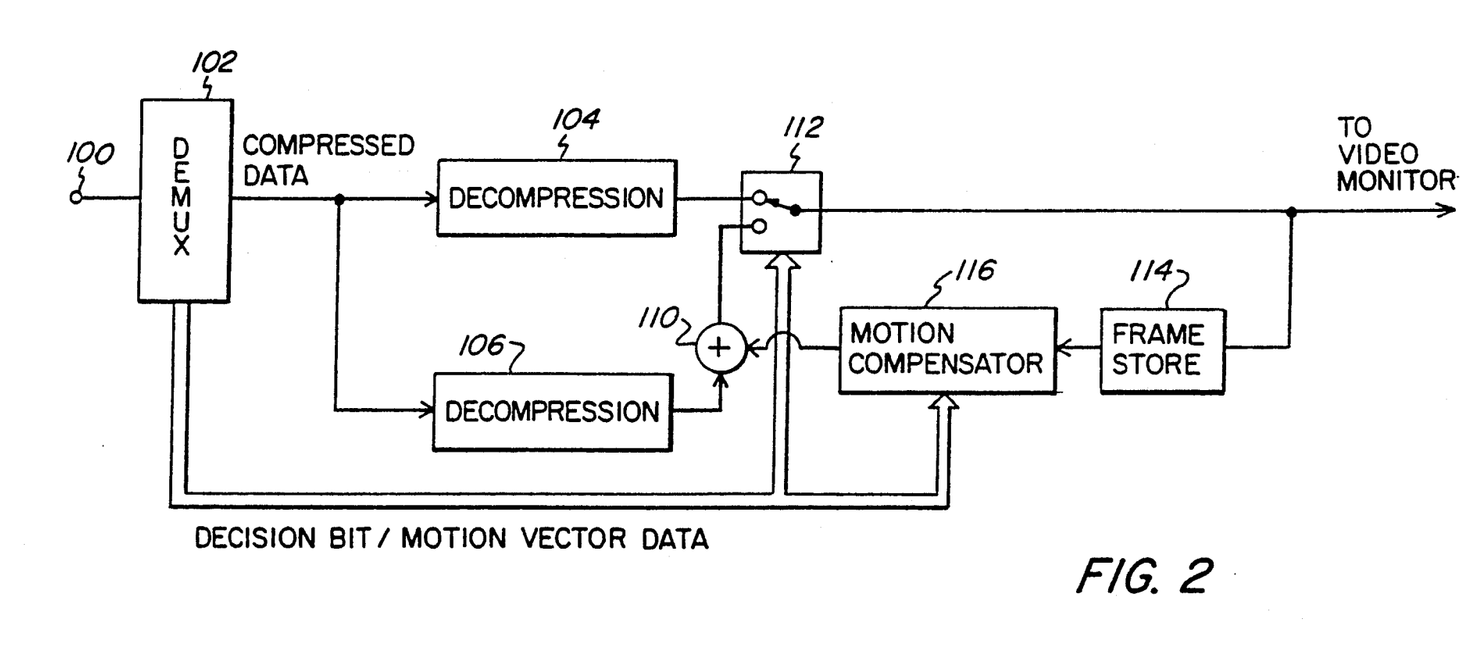
FIG. 2 is a block diagram illustrating a decoder for receiving signals transmitted from the encoder of FIG. 1.

FIG. 2 illustrates a decoder that can be used at a receiver for reconstructing the video signal. Processing at the decoder is greatly simplified by the multiplexing of the decision bit and motion vector data with the encoded video at the transmitter. The received signal is input at terminal 100 and coupled to a demultiplexer 102 that strips the decision bit and motion vector data as appropriate from the incoming signal. The compressed data is then input to a first decompression path comprising decompression circuitry 104 corresponding to first compression path circuitry 34. The data is also input to a second decompression path containing circuitry 106 corresponding to second compression path circuitry 36. The decision bit actuates switch 112 to output the decompressed data from decompression circuitry 104 in the non-motion compensated first decompression path (e.g., when a refresh row is being received), or from the decompression circuitry 106 in the motion compensated path, with the predictor signal added to the decompressed data via adder 110. The predictor signal is obtained by displacing the previous frame data stored in frame store 114 using the same motion vectors that were derived at the encoder. Motion compensator 116 then outputs the predictor signal to adder 110. The output signal from switch 112 can be converted to analog form and coupled to a video monitor for display of the video program.

In the event the same compression algorithm is used in both the first and second encoder compression paths, only one decompression circuit will be required in the decoder. In this event, a switch similar to encoder switch 54 is provided at adder 110 in the decoder, to selectively add the predictor signal to the decompressed data for all rows except the row currently being refreshed.

It will now be appreciated that the present invention provides a method and apparatus for refreshing an image area during the transmission of a set of motion compensated sequential video images. Although the invention has been described in connection with the refreshing of successive rows, with each row containing a plurality of video lines, refreshing can also be performed using regions having other formats, such as on a block-by-block or column-by-column basis. There is no requirement that regions be refreshed in a consecutive order, or that one region be refreshed in each successive video image. Several regions can be refreshed in each image, and/or some images can be transmitted without any refreshing. The selection of a particular format refresh in accordance with the present invention will depend on various practical considerations, such as the complexity of a particular image, the data transmission rates, available buffer memory, and the like.

In a column-by-column embodiment, each vertical column would be analogous to the horizontal rows described herein, except each column would include a plurality of vertical lines instead of the horizontal lines described above. In many applications, column-by-column refreshing is particularly advantageous because it minimizes the amount of non-motion compensated (PCM) data that is transmitted for each individual horizontal scan line. Instead of transmitting full horizontal rows of data in the inefficient PCM format, only a single column width of PCM data will be transmitted for each row at a time. This facilitates efforts to maintain a reasonably constant bit rate throughout the data transmission.

Those skilled in the art will appreciate that numerous other modifications and adaptations may be made to the preferred embodiment described herein, without departing from the spirit and scope of the invention, as set forth in the following claims.

What is claimed is:

1. A method for refreshing motion compensated video images comprising the steps of:
   obtaining a set of successive video images to be refreshed;
   processing said video images using motion compensation to reduce the amount of data required to transmit the images to a receiver;
   processing different regions in a plurality of said video images without motion compensation during a refresh cycle, whereby an image area defined by the aggregate of said regions is progressively refreshed by the non-motion compensated processing during said refresh cycle; and
   controlling the motion compensation process of said video images to prevent data contained in regions not yet refreshed during a current refresh cycle from corrupting data contained in regions that have been refreshed during the current refresh cycle.

2. A method in accordance with claim 1 wherein said controlling step limits the motion compensation process of regions in a current video image that have been refreshed during said current refresh cycle to regions of other video images that have been refreshed during the current refresh cycle.

3. A method in accordance with claim 2 wherein:
   said motion compensation process is performed on a block-by-block basis by comparing blocks containing pixel data for a current video image to blocks containing pixel data for a previous video image.

4. A method in accordance with claim 3 comprising the further step of:
   encoding blocks processed without motion compensation to identify them as non-motion compensated data.

5. A method in accordance with claim 1 wherein successive subsets of received video images are refreshed during successive refresh cycles.

6. A method in accordance with claim 1 wherein adjacent regions of successive video images are processed in consecutive order to refresh said image area.

7. A method in accordance with claim 6 wherein said regions comprise columns of pixel data.

8. A method in accordance with claim 6 wherein said regions comprise rows of pixel data.

9. A method in accordance with claim 1 wherein said regions comprise columns of pixel data.

10. A method in accordance with claim 1 wherein said regions comprise rows of pixel data.

11. A method in accordance with claim 1 comprising the further step of:
    encoding regions processed without motion compensation to identify them as non-motion compensated data.

12. Apparatus for progressively refreshing a sequence of motion compensated video images comprising:
    a first path for compressing video image data without motion compensation;
    a second path including motion compensating means for compressing video image data with motion compensation;
    means for selecting data from said first or second path for transmission;
    means for controlling said selecting means to provide non-motion compensated data from said first path for refreshing different regions in a plurality of video images during a refresh cycle, and to selectively provide motion compensated data from said second path or non-motion compensated data from said first path for remaining portions of said video images; and means for controlling said motion compensating means to prevent data contained in regions not yet refreshed during a current refresh cycle from corrupting data contained in regions that have been refreshed during the current refresh cycle.

13. Apparatus in accordance with claim 12 wherein said controlling means limit the motion compensation process of regions in a current video image that have been refreshed during the current refresh cycle to regions of other video images that have been refreshed during the current refresh cycle.

14. Apparatus in accordance with claim 13 wherein: said motion compensating means compare portions of a current image to portions of a previous image on a block-by-block basis.

15. Apparatus in accordance with claim 12 wherein said controlling means cause the selecting means to provide adjacent regions of successive video images in consecutive order to refresh said image area.

16. Apparatus in accordance with claim 15 wherein said regions comprise columns of pixel data.

17. Apparatus in accordance with claim 15 wherein said regions comprise rows of pixel data.

18. Apparatus in accordance with claim 12 wherein said regions comprise columns of pixel data.

19. Apparatus in accordance with claim 12 wherein said regions comprise rows of pixel data.

20. Apparatus in accordance with claim 12 further comprising:

means for encoding data from said first path to identify it as non-motion compensated data.

* * * * *